United States Patent
Brochard et al.

(10) Patent No.: US 12,515,437 B2
(45) Date of Patent: Jan. 6, 2026

(54) CELLULAR SANDWICH PANEL CONTAINING BORON NITRIDE POWDER AND MANUFACTURING METHOD FOR SAID PANEL

(71) Applicant: Airbus Operations SAS, Toulouse (FR)

(72) Inventors: Wolfgang Brochard, Toulouse (FR); Jonathan Blanc, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 199 days.

(21) Appl. No.: 18/190,716

(22) Filed: Mar. 27, 2023

(65) Prior Publication Data
US 2024/0109270 A1 Apr. 4, 2024

(30) Foreign Application Priority Data
Mar. 30, 2022 (FR) ..................................... 2202848

(51) Int. Cl.
| | | |
|---|---|---|
| *B32B 3/12* | (2006.01) | |
| *B32B 3/26* | (2006.01) | |
| *B32B 5/02* | (2006.01) | |
| *B32B 5/16* | (2006.01) | |

(52) U.S. Cl.
CPC ............... *B32B 3/12* (2013.01); *B32B 3/266* (2013.01); *B32B 5/02* (2013.01); *B32B 5/16* (2013.01); *B32B 2250/40* (2013.01); *B32B 2260/021* (2013.01); *B32B 2262/0269* (2013.01); *B32B 2264/107* (2013.01); *B32B 2605/18* (2013.01)

(58) Field of Classification Search
None
See application file for complete search history.

(56) References Cited

U.S. PATENT DOCUMENTS

| | | | |
|---|---|---|---|
| 4,598,007 A | 7/1986 | Kourtides et al. | |
| 2008/0166563 A1* | 7/2008 | Brittingham | ............... C08J 3/18 219/202 |
| 2015/0086335 A1* | 3/2015 | Merlo | ..................... F02C 7/045 181/292 |
| 2018/0066608 A1 | 3/2018 | Bienvenu et al. | |
| 2022/0274887 A1 | 9/2022 | Erb et al. | |

FOREIGN PATENT DOCUMENTS

| | | |
|---|---|---|
| WO | 2016181073 A1 | 11/2016 |
| WO | 2021034490 A2 | 2/2021 |

OTHER PUBLICATIONS

French Search Report for French Patent Application No. 2202848 dated Oct. 20, 2022; priority document.

* cited by examiner

*Primary Examiner* — Chinessa T. Golden
(74) *Attorney, Agent, or Firm* — Greer, Burns & Crain, Ltd.

(57) ABSTRACT

A cellular sandwich panel containing boron nitride powder and a manufacturing method. The sandwich panel has a first skin and a second skin between which is positioned a cellular core with cells opening out on both sides respectively in the first skin and the second skin, the cells being separated from one another by side walls. The side walls of the core comprise an aramid-, carbon- or glass-fibre-based reinforcement, a polymeric reinforcing resin and boron nitride powder.

9 Claims, 7 Drawing Sheets

CELLULAR SANDWICH PANEL CONTAINING BORON NITRIDE POWDER AND MANUFACTURING METHOD FOR SAID PANEL

CROSS-REFERENCES TO RELATED APPLICATIONS

This application claims the benefit French Patent Application Number 2202848 filed on Mar. 30, 2022, the entire disclosure of which is incorporated herein by way of reference.

FIELD OF THE INVENTION

The present invention relates to the sandwich panels of an aircraft and in particular the sandwich panels arranged in propulsion units.

BACKGROUND OF THE INVENTION

Sandwich panels are conventionally installed in various areas of an aircraft, in particular to reduce acoustic dispersion, and for example in cabin trim panels or propulsion units, which are used to illustrate this description. An aircraft turbo-jet engine nacelle comprises, from front to back, a first section upstream of the aerodynamic flow through the nacelle of the aircraft in flight, referred to as the air intake, a second section that covers the casing of the engine fan, referred to as the fan cover, and a third section that usually has a thrust reverser unit surrounding the turbine body of the engine downstream of the aerodynamic flow. The thrust reverser unit (TRU) usually has an outer fixed structure (OFS) that, together with a concentric inner fixed structure (IFS), defines an annular duct for channelling the cold air flow.

The inner fixed structure includes a sandwich panel to withstand the structural forces. The sandwich panel facilitates heat transfer from the inside to the outside and can also have an acoustic function. For this purpose, such a panel comprises a structure interposing a heat transfer vehicle in the form of a cellular core made of aluminium or titanium between two skins. This panel frequently comprises the superposition of a first aerodynamic outer skin made of composite material and a second inner supporting skin also made of composite material, between which there is a honeycomb core made of metal (aluminium or titanium). Aluminium or titanium allow for lower thermal resistance compared to other materials with glass, carbon or aramid reinforcement, and enable better heat energy transfer. However, aluminium or titanium have drawbacks such as being subject to corrosion or being heavier than other materials, such as aramid. This greatly increases the weight of the sandwich panel.

SUMMARY OF THE INVENTION

The present invention is intended to provide an aircraft sandwich panel for the fixed internal structure of an aircraft nacelle in the illustrated example, mitigating corrosion issues related to the use of aluminium honeycomb materials and lightening the structure compared to metal honeycomb materials.

For this purpose, the present invention relates to an aircraft sandwich panel comprising a first skin and a second skin between which is positioned a cellular core comprising cells opening out on both sides respectively in the first skin and the second skin, the cells being separated from one another by side walls, characterized in that the side walls of the core comprise an aramid-, carbon- or glass-fibre-based reinforcement, a polymeric reinforcing resin and boron nitride powder.

The invention therefore proposes an alternative to the aircraft sandwich panel with an aluminium core to obviate issues relating to corrosion and mass, thereby offering a more lightweight structure guaranteeing a good heat transfer from one face of the panel to the other.

The invention includes at least one of the following optional features, taken individually or in combination.

The reinforcing resin comprises boron nitride powder.

A bonding resin used in the manufacture of the cellular core to bond the reinforcement layers to each other comprises boron nitride powder.

Adhesive films between the skins and the core contain boron nitride powder.

At least some of the cells are at least partially filled with a filler material containing boron nitride powder.

The boron nitride powder is a hexagonal boron nitride powder.

The reinforcement is made from meta-aramid fibres.

One skin is perforated.

The invention also relates to a propulsion unit comprising a nacelle having an inner fixed structure characterized in that the inner fixed structure comprises a sandwich panel having one or more of the aforementioned features.

The invention also relates to an aircraft characterized in that it has a portion provided with a sandwich panel having one or more of the aforementioned features.

The invention also relates to the manufacturing method for such a sandwich panel. The manufacturing method for the sandwich panel is characterized in that it includes the following steps: stacking layers of aramid-, carbon- or glass-fibre-based reinforcement such that said layers together form a block containing cells; adding boron nitride powder to at least some of the side walls of said cells including a reinforcing resin; and, cutting the core to the desired size.

The steps can be performed in this order or in a different order, since the boron nitride powder can be added to the reinforcement before or after the layers are stacked.

The invention includes at least one of the following optional features, taken individually or in combination.

The boron nitride powder is mixed with the polymeric reinforcing resin before being deposited on the reinforcement by immersing the block in a bath of reinforcing resin.

The boron nitride powder is mixed with a bonding resin applied in parallel lines to said reinforcing layers to fasten said layers together to form the block by expansion.

BRIEF DESCRIPTION OF THE DRAWINGS

Other objectives, features and advantages are set out in the description of the invention below, given purely by way of non-limiting example and with reference to the attached drawings, in which.

DETAILED DESCRIPTION OF THE PREFERRED EMBODIMENTS

Figure 1:
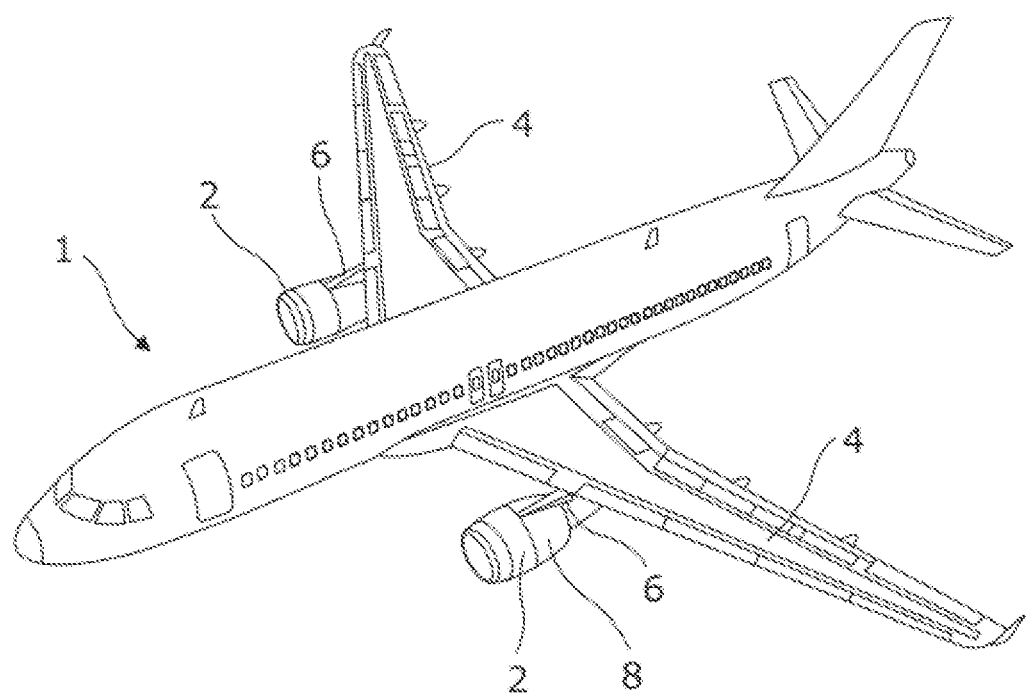
FIG. 1 is a perspective view of an aircraft provided with a propulsion unit equipped with a nacelle comprising a sandwich panel according to the present invention.
Figure 2:
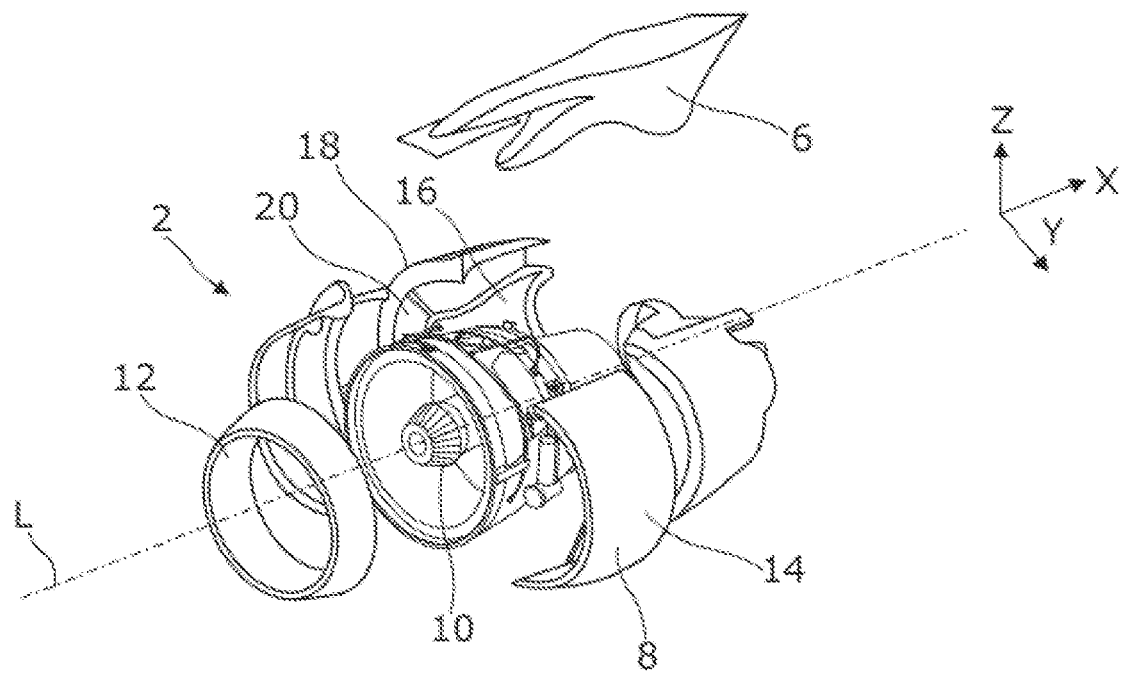
FIG. 2 is an exploded perspective view of a nacelle and a pylon that may comprise a sandwich panel according to the present invention.

FIG. 1 shows an aircraft 1 with a propulsion unit 2. In the illustrated embodiment, the propulsion unit 2 is attached to the wing surface 4 by a pylon 6. The propulsion unit 2 is a device for generating a thrust that constitutes the propelling force of the aircraft 1. As shown in FIG. 2, the propulsion unit comprises a nacelle 8 surrounding an engine 10 such as a turbo-jet engine having the three sections described above. FIG. 2 shows the air intake 12, the fan cover 14, the inner fixed structure 16, the outer fixed structure 18 and the annular duct 20 used to channel the cold air. The nacelle 8 extends about a longitudinal axis L oriented in a longitudinal direction X. The direction Y corresponds to the direction oriented transversely to the nacelle 8. The direction Z is the vertical direction or height when the aircraft is on the ground. The three directions X, Y and Z are orthogonal to each other. In the following description, the terms "front" and "rear", "upstream" and "downstream" are understood according to the direction of the air flow in the propulsion unit during operation, i.e. in the direction and sense of the axis X in FIG. 2. The air enters through the front of the propulsion unit, i.e. through the air intake 12 of the nacelle, and is discharged through the rear of the nacelle.

Figure 3:
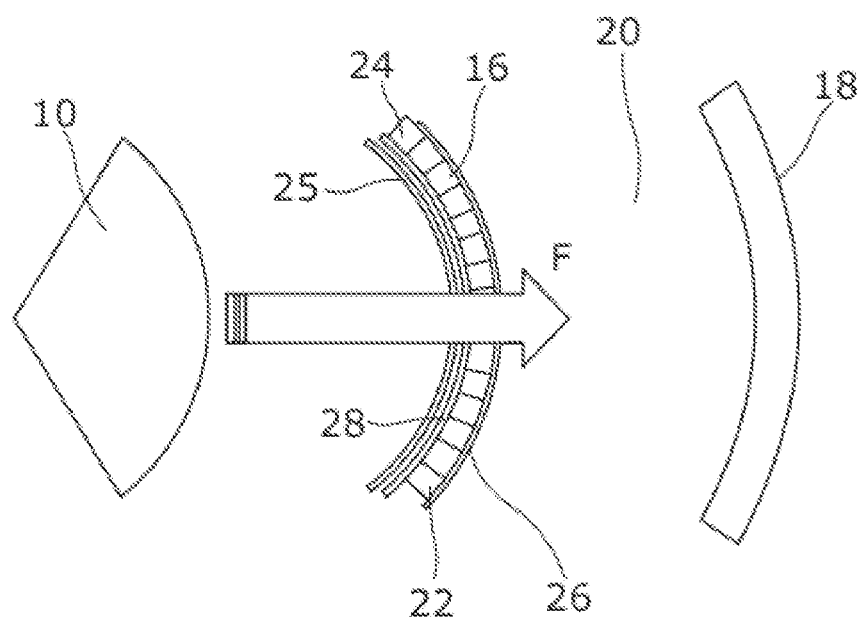
FIG. 3 is a schematic view showing the heat transfer in the propulsion unit in the sandwich panel installed about the engine.

As shown in FIG. 3, the present invention relates to a sandwich panel 22 with a cellular core 24 used in the inner fixed structures 16 of aircraft propulsion units to allow conductive heat transfer in a radial direction, as shown by an arrow F in FIG. 3, from the engine 10, about which temperatures may be in the range of 300° C. to 500° C., towards the annular duct 20 conveying the cold air. In view of the high temperatures about the engine, a thermal protection layer 25 ensures the thermal integrity of the sandwich panel 22.

Figure 4:
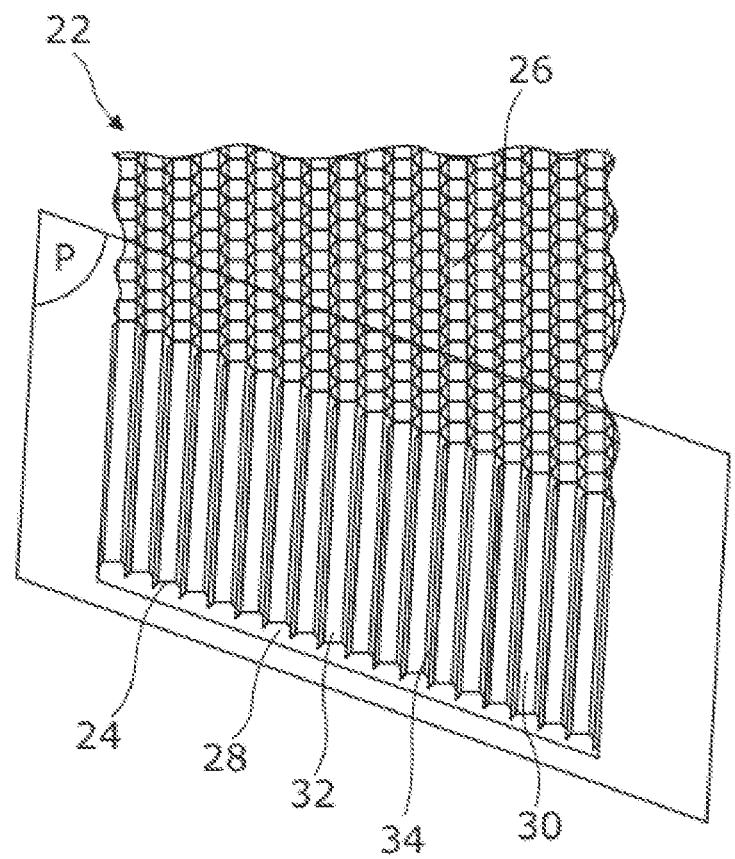
FIG. 4 is a partial perspective view of a sandwich panel according to the present invention.
Figure 5:
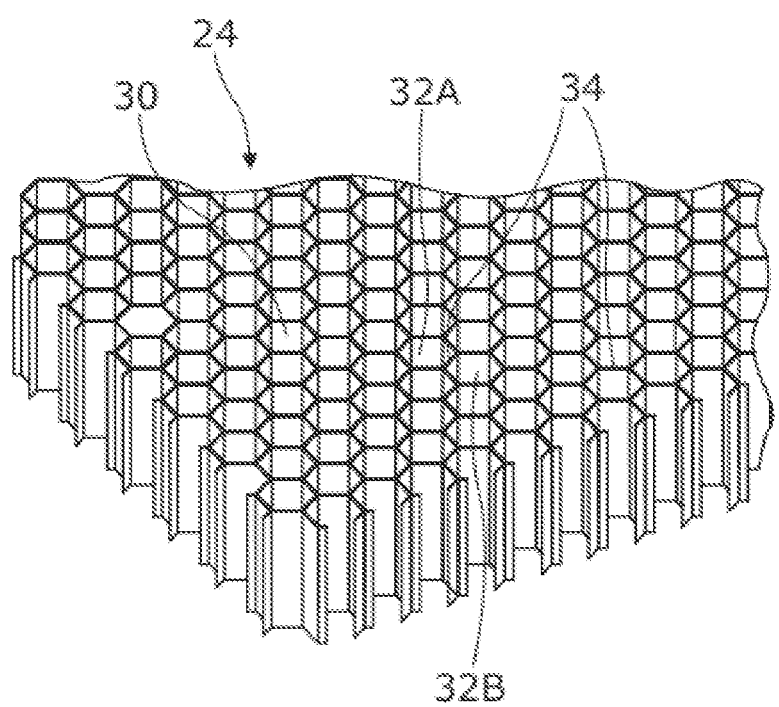
FIG. 5 is a partial perspective view of a cellular core of a sandwich panel according to FIG. 4.

As shown in FIG. 4, the sandwich panel 22 has two skins 26, 28 with the cellular core 24 interposed therebetween. The panel 22 comprises a first skin 26 oriented in the radial direction towards the outer fixed structure 18, a second supporting skin 28 essentially designed to ensure the structural strength of the panel 22 oriented in the radial direction towards the body of the engine 10 and the cellular core 24 on both sides of which the first and second skin 26, 28 are fastened. According to a possible embodiment of the invention, the second skin 28 exposed to the noise, i.e. in the illustrated case the skin facing the engine, is perforated so that the sandwich panel can perform an acoustic function. According to the embodiment illustrated in FIGS. 4 and 5, the cellular core 24 comprises conduits 30 opening out on both sides, in the first skin 26 and the second skin 28 respectively. The first skin 26 and the second skin 28 close the conduits 30 to form the cells 32 of the core 24. The conduits 30 are separated from each other by side walls 34. A side wall 34 separates one cell 32A from the adjacent cell 32B. According to a specific embodiment as shown in FIGS. 4 and 5, the cellular core 24 is honeycomb-shaped, i.e. with cells 32 formed by conduits 30 of hexagonal section. Any other conduit shape is possible. The geometry of the cells is not limited to the geometry shown. The core material may have cells of any shape. In the example shown, the skins 26, 28 are made of a composite material such as a carbon-fibre-reinforced polymer (CFRP). According to variants, the fibres used can be glass fibres or aramid fibres.

Figure 6:
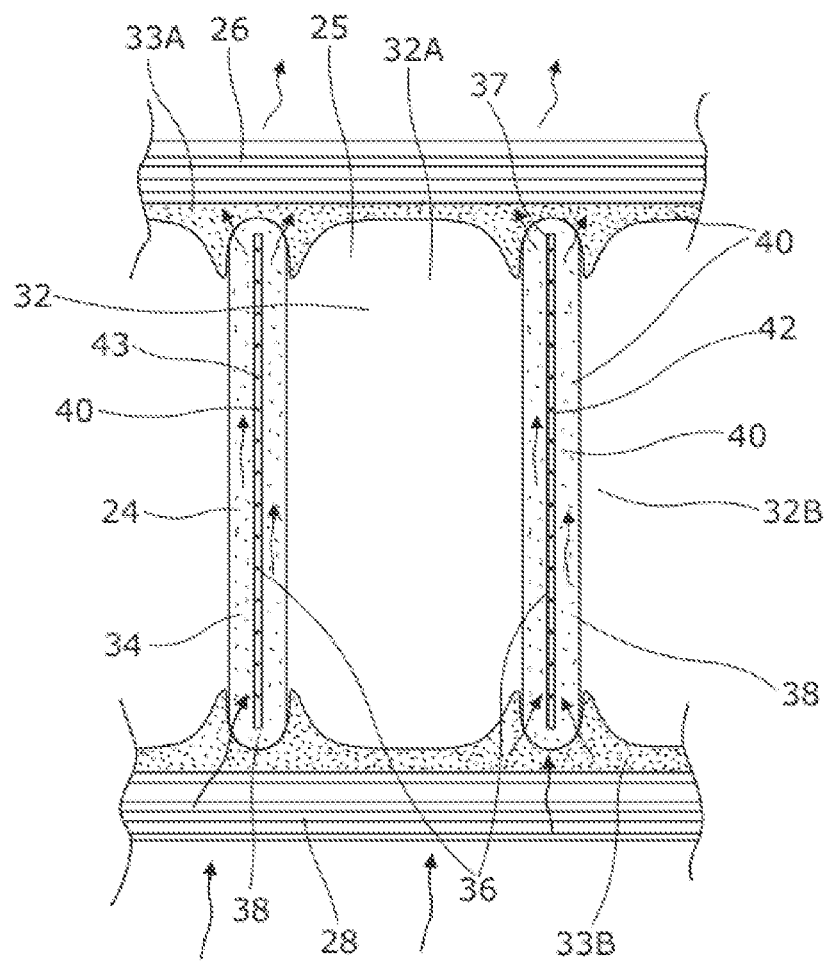
FIG. 6 is a partial schematic cross-section view of a sandwich panel according to the present invention taken in a plane P shown in FIG. 4 parallel to the longitudinal direction of the conduits of the cellular core and passing through two side walls separating three cells of the core.
Figure 7:
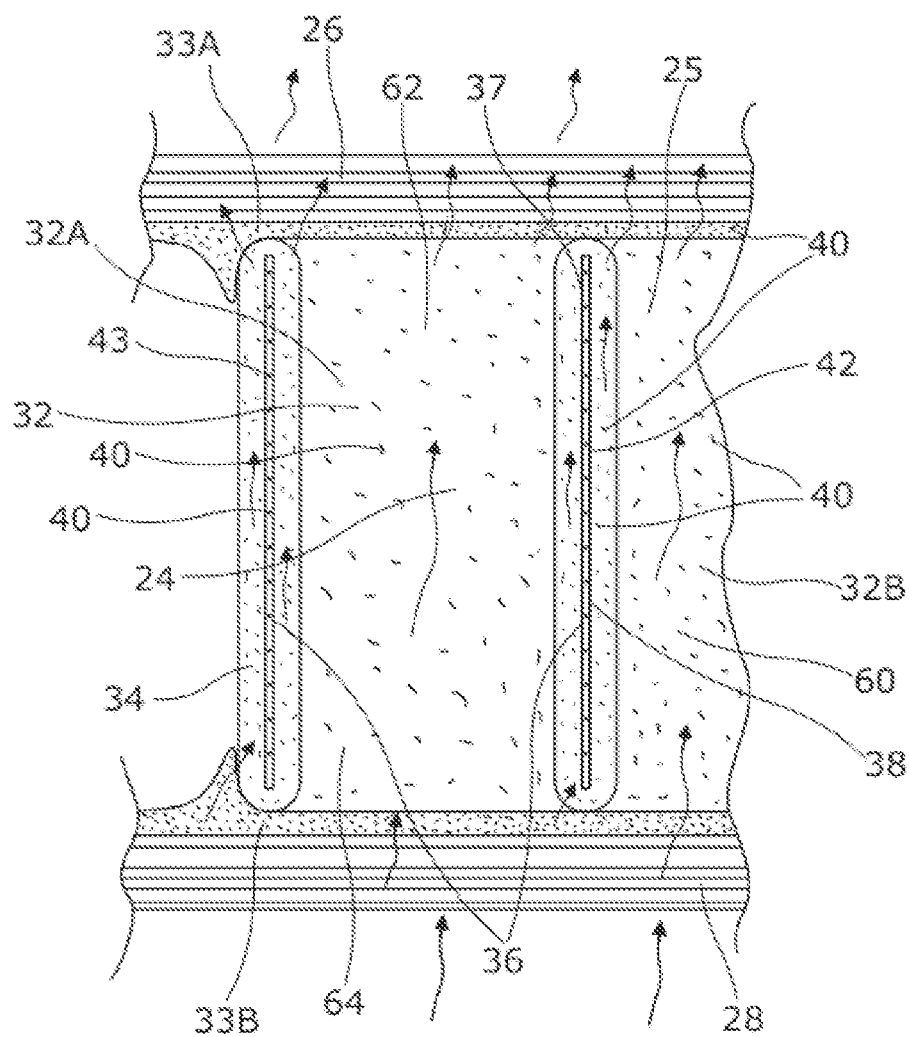
FIG. 7 is a partial schematic cross-section view of a sandwich panel according to the present invention taken in a plane P shown in FIG. 4 parallel to the longitudinal direction of the conduits of the cellular core and passing through two side walls separating three cells of the core, in which some of the cells are filled with filler material.

As shown in FIGS. 6 and 7, a first adhesive film 33A is interposed between the core 24 and the first skin 26 and a second film 33B is interposed between the core 24 and the second skin 28. The films 33A and 33B are made from a polymer resin such as a thermoplastic resin, a thermosetting (e.g. epoxy, phenolic) resin, or the like.

According to the present invention, the cellular core 24 comprises fibre-based reinforcements 36 in the form of sheets, woven fibres, unidirectional, multidirectional, continuous or discontinuous fibres, and the like. The reinforcement 36 in the illustrated example is a sheet 37 made from aramid fibres, referred to as aramid paper, and for example meta-aramid fibres such as NOMEX (registered trademark). The reinforcement is combined with a resin 38, hereinafter referred to as reinforcing resin 38. In the sheet example, the sheet 37 is coated with a heat-resistant polymer resin 38. In the case of fibres, the fibres are incorporated into and mixed with the resin 38. The resin is a thermoplastic or thermosetting resin such as a phenolic resin, an epoxy resin or for example a photopolymerizable (PEI), polyamide-imide (PAI), aliphatic polyamide (PA), polypropylene (PP), polyetheretherketone (PEEK), polyetherketoneketone (PEKK), or polybismaleimides (BMI) resin. At least some of the side walls 34 of the cells 32 of the core 24, and all of said side walls in the illustrated embodiment, comprise boron nitride powder 40 represented by dots in FIGS. 6 and 7. The boron nitride powder 40 is a hexagonal boron nitride powder in the illustrated example. The materials used to make up the core 24 obviate all corrosion issues. The hexagonal boron nitride powder 40 reduces the thermal resistance by improving conductivity and therefore heat transfer. Finally, the cellular core 24 is more lightweight than a metal core. The heat represented by small arrows in FIGS. 6 and 7 is transferred through the side walls. More specifically, the hexagonal boron nitride powder 40 is added to the reinforcing resin 38.

In some embodiments, an adhesive 42, for example in the form of resin 43 (such as phenolic, epoxy, or other resin), is used to set and hold the reinforcement 36, which is shown in the illustrated embodiment as a sheet of aramid paper 37. A resin for the sheets of aramid paper is for example phenolic resin. The sheets of paper are glued together to form the cellular core, as detailed below. The resin 43 is referred to as bonding resin to differentiate said bonding resin from the reinforcing resin 38. In these embodiments using bonding resin 43, hexagonal boron nitride powder 40 may be added to the bonding resin 43, as shown in FIGS. 6 and 7. Hexagonal boron nitride powder may therefore be added to the bonding resin 43 and/or the reinforcing resin 38. The reinforcing resin 38 and/or the bonding resin 43 impregnated with hexagonal boron nitride powder are the primary vehicles for heat transfer flow through the sandwich panel 22. These properties of the hexagonal boron nitride powder 40 improve the thermal conductivity of the reinforcing resin 38 and/or the bonding resin 43 to allow the aramid-fibre-based core 24 to be as efficient in terms of heat transfer as an aluminium core, while providing a more lightweight cellular core structure. According to one embodiment, the amount of hexagonal boron nitride powder in the resin is between 0.01% and 20% of the resin by mass or volume.

As shown in FIG. 7, at least some of the cells 32 are at least partially filled with a filler material 62. The material can be putty, resin or the like. At least partially filling said cells provides local structural reinforcement. In the illustrated embodiment, the material is referred to as filler resin 64 to distinguish said material from the other resins described above. According to one embodiment of the innovation, boron nitride powder 40 is added to the filler material 62 and for example to the filler resin 64.

The manufacturing method for the sandwich panel 22 is described below with reference to FIGS. 8 to 10. The manufacturing method for the panel 22 involves first manufacturing the cellular core 24. Several different embodiments of the core are possible, examples of which are given below.

Figure 8:
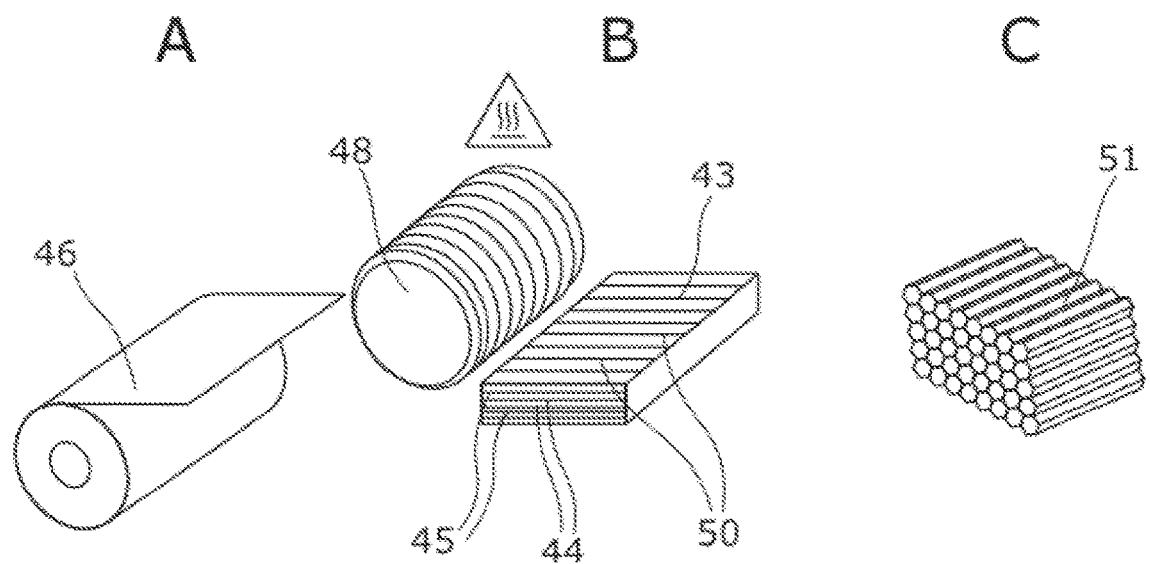
FIG. 8 is a schematic view of steps of a first manufacturing method for a cellular core of a sandwich panel according to the present invention.
Figure 9:
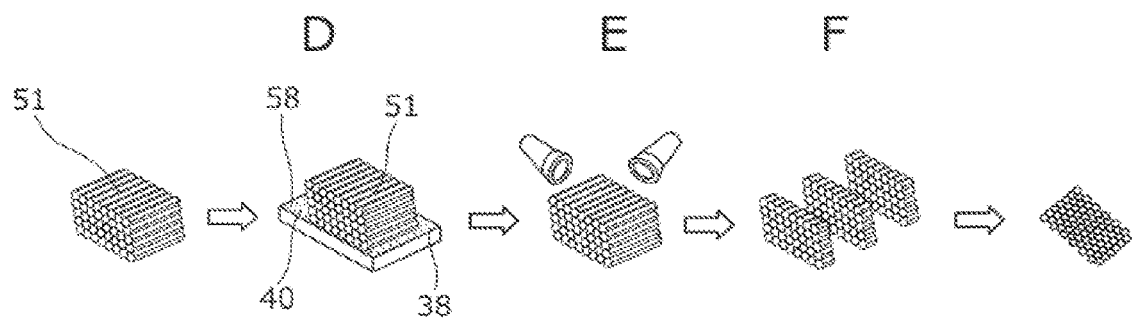
FIG. 9 is a schematic view of the following steps of the first manufacturing method for a cellular core of a sandwich panel shown in FIG. 8.

According to a first manufacturing method illustrated in FIGS. 8 and 9, the method involves manufacturing the structure by expanding layers 44 of the same shape and size stacked on top of each other and fastened to each other. In a first step indicated using reference sign A in FIG. 8, a roll 46 of resin-free reinforcement (in this case a sheet of paper) is unwound beneath a machine 48 that deposits the bonding resin 43 in lines 50 parallel to each other. In a step B, the roll 46 on which these lines 50 are deposited is cut into reinforcing layers 45 (in this case paper sheets) of the same shape and size. The layers 45 are stacked on top of each other and are bonded together by lines 50 of bonding resin 43. In a step C, the formed assembly is stretched to obtain a block 51 with the desired cellular core structure. FIG. 9 shows the sequence of treatments applied to the block 51. The next step D involves immersing the block 51 in a bath 58 of reinforcing resin 38. In the example embodiment shown, the chosen polymer reinforcing resin 38 is phenolic resin. The reinforcing resin 38 contains hexagonal boron nitride powder 40. When the block 51 emerges from the bath 58, the side walls 34 are impregnated with reinforcing resin 38 and hexagonal boron nitride powder 40. The next step E involves curing the resin 38 of the coated block 51 by any known means. One possible means, for example, could be an autoclave with an enclosure enabling said curing. In a final step F, the block 51 is cut to the desired size for the height of the conduits 30 of the core 24.

According to a first variant, hexagonal boron nitride powder 40 is added to the bonding resin 43. The side walls 34 of the cellular core 24 of the block 51 then contain a larger amount of hexagonal boron nitride powder 40, which is already contained in the reinforcing resin 38. According to the second variant, hexagonal boron nitride powder 40 is not added to the resin 43.

Figure 10:
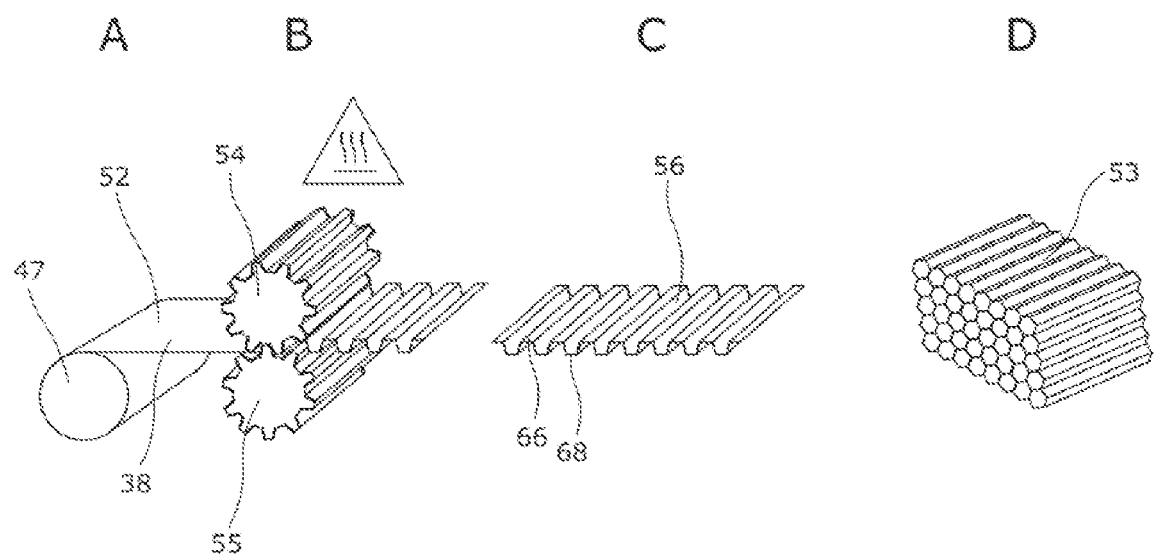
FIG. 10 is a schematic view of steps of a second manufacturing method for a cellular core of a sandwich panel according to the present invention.

A second embodiment illustrated in FIG. 10 involves, in a first step A, unwinding a roll 47 of specific reinforcement 52 referred to as complex reinforcement, since a reinforcement resin 38 has already been added to said reinforcement. In this example, the complex reinforcement incorporates a reinforcing resin 38. The method includes a step of deforming the complex reinforcement 52 by pressing to form a succession of bumps 66 and hollows 68, the shape of which is chosen depending on the desired shape of the cell. For cylindrical cells of circular section, the complex reinforcement 52 is corrugated. According to the illustrated embodiment, the method involves unwinding the roll 47 of complex reinforcement 52 and passing said reinforcement between two serrated presses 54 and 55 to impress a semi-cell shape of semi-hexagonal section on the reinforcement. According to a step C, the reinforcement 52 is cut into layers 56 of the same shape and size, marked with the impression of the press. According to a step D, the layers 56 are stacked on top of each other with the highest reliefs of one layer against the highest reliefs of an adjacent layer to obtain a block 53 with the desired cellular-core structure. The layers are assembled together by thermal welding, gluing or any other known method.

Other methods of manufacturing the block 51, 53 are possible.

As shown in reference to FIG. 7, at least some of the cells 32 are at least partially filled with a filler material 62. According to one embodiment of the invention, boron nitride powder is added to the filler material 62 and for example to the filler resin 64.

As shown in FIGS. 6 and 7, hexagonal boron nitride powder 40 is added to the films 33A and 33B enabling the skins 26, 28 to be fastened to the cellular core 24.

Depending on the different possible combinations of the above variants, there may be hexagonal boron nitride powder 40 in the reinforcing resin 38 and/or in the bonding resin 43. According to one embodiment, boron nitride powder 40 is mixed with the reinforcing resin 38 and/or the bonding resin 43 before being applied to the reinforcement. Boron nitride powder may also be added to the adhesive films 33A, 33B interposed between the skins 26, 28 and the cellular core 24 and/or to the filler material 62 for the cells 32 of the core.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft sandwich panel comprising:
a first skin, a second skin, and a cellular core between the first skin and the second skin, the cellular core comprising
cells having open sides at the first skin and the second skin, respectively, the cells separated from one another by side walls, wherein the side walls of the cellular core comprise an aramid-, carbon- or glass-fibre-based reinforcement, a polymeric reinforcing resin, and a boron nitride powder, wherein the aircraft sandwich panel further comprises an adhesive film between the first skin and the core and between the second skin and the core, wherein the adhesive films comprise boron nitride powder.

2. The aircraft sandwich panel according to claim 1, wherein the reinforcing resin comprises boron nitride powder.

3. The aircraft sandwich panel according to claim 1, wherein a bonding resin used to bond layers of the aramid-, carbon- or glass-fibre-based reinforcement to each other comprises boron nitride powder.

4. The aircraft sandwich panel according to claim 1, wherein at least some of the cells are at least partially filled with a filler material comprising boron nitride powder.

5. The aircraft sandwich panel according to claim 1, wherein the boron nitride powder is a hexagonal boron nitride powder.

6. The aircraft sandwich panel according to claim 1, wherein the aramid-, carbon- or glass-fibre-based reinforcement comprises a sheet with meta-aramid fibres.

7. The aircraft sandwich panel according to claim 1, wherein one skin is perforated.

8. A propulsion unit comprising:
a nacelle having an inner fixed structure, wherein the inner fixed structure comprises the aircraft sandwich panel according to claim 1.

9. An aircraft comprising a portion provided with the aircraft sandwich panel according to claim 1.

* * * * *